Nov. 12, 1940. K. GETTWART ET AL 2,221,635
PORTABLE PUMP AND ELECTRIC MOTOR UNIT
Filed Aug. 20, 1938 2 Sheets-Sheet 1

Inventors.
KLAUS GETTWART
AND HELMUTH SCHMIDT.
By Maxwell E. Sparrow
Attorney

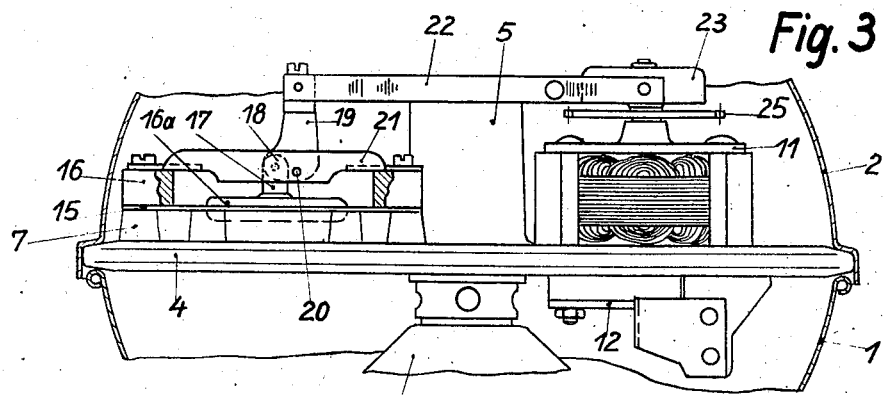
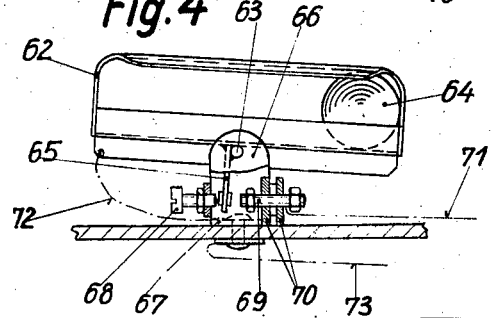
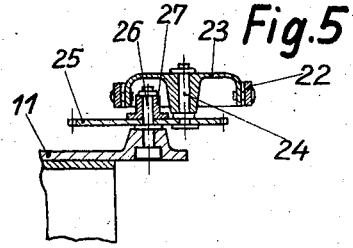
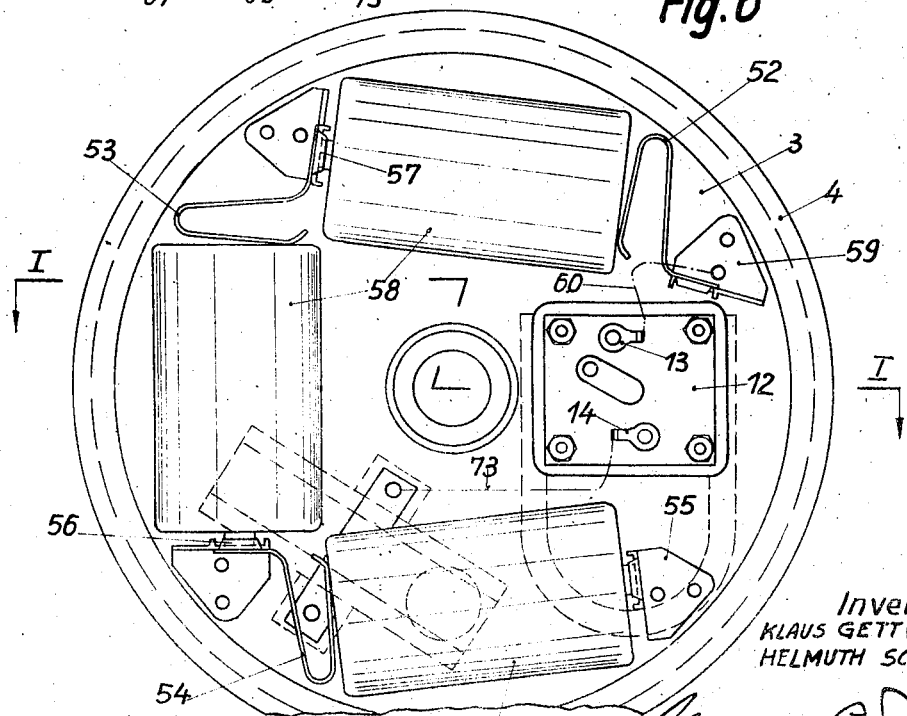

Patented Nov. 12, 1940

2,221,635

UNITED STATES PATENT OFFICE 2,221,635

PORTABLE PUMP AND ELECTRIC MOTOR UNIT

Klaus Gettwart and Helmuth Schmidt, Berlin, Germany

Application August 20, 1938, Serial No. 225,982
In Germany August 31, 1937

5 Claims. (Cl. 103—152)

Our invention relates to a portable pump and motor unit which is particularly suitable for indoor fountains.

It is an object of our invention to provide a unit of the kind referred to whose mechanism is protected against leakage water, which is self-contained and can readily be placed where it is required.

To this end, we provide a supporting plate, means on the plate for conveying water from a suitable supply, and means, also on the plate, for delivering the water through a nozzle. On both sides of the supporting plate, we arrange casings. One of the casings houses a diaphragm pump which is mounted on the plate, and connected to the said suction and delivery means, and a motor, also mounted on the plate and operatively connected to the pump. A battery for the motor is mounted on the other side of the plate in the other casing.

By providing the diaphragm pump, we avoid the inevitable leakage of water which is always present in piston pumps. With exception of the said suction and delivery means, the water is strictly excluded from the interior of the casing which houses the pump and the motor, and the motor is protected not only against water but also against noxious vapors from its battery which is housed in the other casing.

It has already been proposed in fountains to arrange a reciprocating diaphragm for circulating water between a basin and a nozzle which returns the water it delivers, to the basin. This is not a pump since it is not able to convey water from a supply by suction, and to deliver the water thus conveyed. Besides, this old fountain has but a single casing in which the motor and its batteries are housed which is objectionable for the reason stated.

In the accompanying drawings, a unit embodying our invention is illustrated by way of example as adapted to an indoor fountain.

In the drawings—

Fig. 3 is an elevation of the diaphragm pump and the motor.

Fig. 4 is a section along the line IV—IV in Fig. 2.

Fig. 5 is a section through a detail along the line V—V in Fig. 2, whilst

Fig. 6 is a view of the supporting plate from below with batteries fitted in position.

Figure 1:
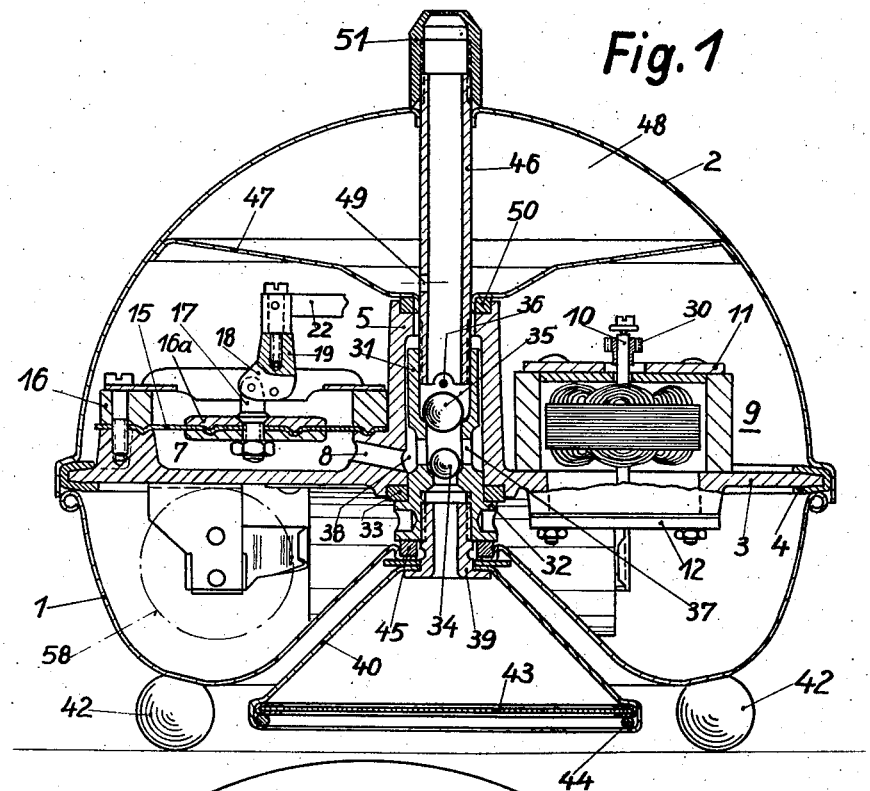
Fig.1 shows a cross-section through the fountain on the line I—I in Fig. 2.
Figure 2:
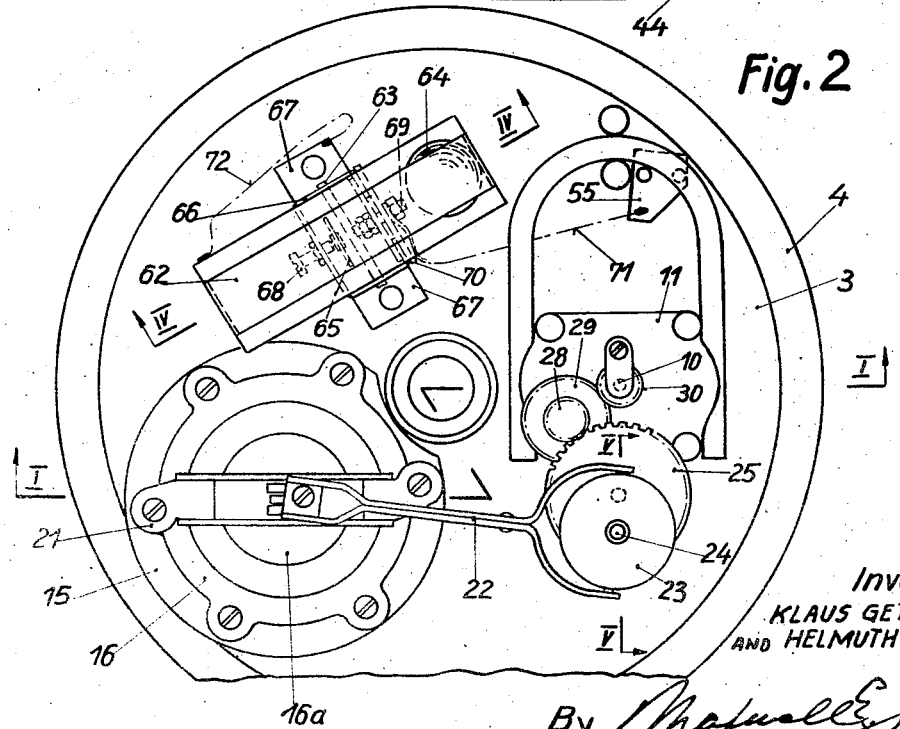
Fig. 2 is a plan view of the fountain with the upper casing portion removed.

The fountain shown in the drawings is furnished with a casing comprising a substantially hemispherical lower portion 1 and a likewise substantially hemispherical upper portion 2, between which parts 1 and 2 there is provided an intermediate supporting plate 3, consisting for example of a pressed material, with the interposition of a rubber sealing ring or washer 4. The intermediate plate 3 possesses a central vertical pipe 5. Integral with the plate 3 is the body 7 of a diaphragm pump, the interior of which communicates with the interior of the central pipe 5 by means of a passage 8. On the intermediate plate 3 there is secured a weak-current motor 9, which serves to drive the said pump and, in the embodiment shown in the drawings, possesses as field magnet a horseshoe magnet, whilst the shaft 10 of the motor is disposed vertically and extends out of the upper bearing plate 11. The lower bearing plate 12 of the electro-motor is situated on the lower side of the plate 3 and carries the two terminals 13, 14. The electro-motor is of any suitable design.

The diaphragm of the pump is formed by a sheet of rubber 15, which rests on the pump casing 7 and is firmly clamped by a ring 16, which may also consist of a pressed material. To obtain a proper sealing of the diaphragm 15 the pump casing 7 is furnished with an annular groove, whilst the ring 16 possesses a correspondingly projecting annular ridge, as shown clearly in Fig. 1. On the diaphragm 15 there is located a piston plate 16a comprising two parts, which for the purpose of obtaining a proper seal also interengage by means of projectory ridge and annular groove.

To the piston plate 16a there is secured the rod 17, which is pivoted to the shorter arm 18 of an angle lever 18, 19, which is pivotally mounted at 20 in a metallic member 21 of preferably U-shaped cross-section bridging the ring 16, on which it is firmly screwed down. To the arm 19 of the angle lever 18, 19 there is pivotally connected a connecting rod 22, in such a manner that the rod 22 is enabled to turn about a vertical axis in relation to the arm 19. The connecting rod 22 is pivotally connected by its opposite bifurcated end with a cup-like member 23, secured on a crank pin 24 projecting upwards from a gear wheel 25. The gear wheel 25 is rotatably mounted on the plate 11 about a shaft 26 by means of a boss.

For operation of the gear wheel 25 there is employed a reduction gear having the gear wheels 28, 29, 30, of which the pinion 30 is mounted on the shaft 10 of the motor. When the motor 9 is switched on the diaphragm 15 of the pump accordingly has a reciprocatory motion imparted thereto by the gear as described.

Within the sleeve-like abutment 5 of the intermediate plate 3 there is arranged a water-inlet pipe 31 engaging with a flange 32 below the intermediate plate 3 with the interposition of a rubber washer 33. In the water-inlet pipe 31 there are located two ball valves. The lower valve is designated 34 and preferably consists of metal, whilst the upper valve, designated 35, is preferably composed of hard rubber. The upward movement of the ball 35 is limited by a pin 36. Between the two balls 34, 35 the pipe has a plurality of holes 37 communicating with an outer annular chamber 38 in the central pipe 5, into which there opens the passage 8 from the pump casing. When the pump is in operation the lower 34 acts as suction valve and the upper 35 as pressure valve.

Into the lower end of the water-inlet pipe 31 there is screwed the upper end 39 of a funnel 40, which is located in a corresponding recess 41 in the lower casing portion 1 and projects beyond the lower surface of the portion 1, which latter is supported by preferably spherical feet 42. At the lower end the funnel 40 is covered by a screen 43, which is preferably composed of an intermediate fine screen and a coarser screen on either side, the coarser screens protecting the fine screen against damage. To secure the screen in the funnel 40 there can be employed a split ring 44. The connection between the funnel 39, 40 and the water-inlet pipe 31 is sealed by a rubber washer 45.

Into the upper end of the water-inlet pipe 31 there is screwed the lower threaded end of a pipe 46 projecting out of the casing portion 2 at the top. By means of a partition 47 there is formed in the upper casing portion 2 an air chamber 48, which communicates with pipe 46 by means of a hole 49. When the pipe 46 is screwed into the pipe 31 the partition 47 rests with the interposition of a rubber washer 50 on the central pipe 5 of the intermediate supporting plate 3. To the end of the pipe 46 projecting upwardly out of the casing portion 2 there is screwed a nozzle 51 having one or more discharge openings. For the mounting of the current source 9 for the electromotor, comprising three single batteries connected in series, three resilient clips 52, 53 and 54 and also three three connection pieces 55, 56, 57 are secured to the lower side of the intermediate plate 3, in such a manner that the three batteries 58 are connected in series. From the attachment member 59 of the resilient connection 52 a lead 60 passes directly to the one terminal 13 of the electro-motor 9.

The other terminal 14 is connected by way of a tumbler switch 61 (illustrated more particularly in Fig. 4) with the other pole, i. e., the connection 55. The switch 61 comprises a rail 62 of approximately U-shaped cross-section, which is mounted to rock at 63 in a bracket 66 and contains a ball 64. The bracket 66 is screwed down to the intermediate plate 3 by means of two abutments 67.

On the rail 62 there is a tongue 65, which extends downwards beyond the rocking axis 63 and bears against either an adjustment screw 68, which is screwed into the longitudinal wall of the bracket 66, or against a contact pin 69 which, with the interposition of two insulating plates 70, is held by the correspondingly recessed opposite wall of the bracket 66. A lead 71 passes from the pole piece 55 to the contact pin 69, whilst the rail 62 is in permanent connection with the bracket 66 by means of a lead 72, the bracket at the same time being connected with the terminal 14 of the motor by a lead 73.

In the position of the switch 61 according to Fig. 4 the circuit is broken, whilst after a tilting of the complete device, when the ball 64 rolls to the opposite end of the rail 62, causing the rail 62 to be rocked, the tongue 65 bears against the contact pin 69 and the circuit is thus completed. Completion or interruption of the circuit can accordingly be performed from the exterior, without opening the apparatus, by tilting the latter in one or the other direction.

When the motor is switched on the diaphragm pump commences to operate, whereby water is sucked up through the funnel 40 and is either conducted to the air chamber 48 or is ejected from the nozzle 51 in the form of a continuous jet.

Moisture is unable to penetrate into the interior of the fountain when the latter is placed in water, this being prevented by the various seals and washers referred to.

If it is necessary to renew the batteries after the same have become exhausted, it is merely necessary to unscrew the funnel 40, whereupon the casing portion 1 can be removed and new batteries can be secured to the lower side of the supporting plate 3 without it being necessary to dismantle any parts of the operating means for the fountain.

What we claim as new and desire to secure by Letters Patent is:

1. In a device of the kind described, a supporting plate, casings secured to both sides of the plate, means for conveying water from a supply, and means for delivering the water through a nozzle, said supply and delivering means being arranged on the supporting plate, a pump chamber arranged on the plate in one of the casings, said chamber provided with a pump diaphragm and communicating with inlet and outlet lines, said lines connected to said supply and to said nozzle, respectively, a motor arranged on the plate and in the same casing with the pump chamber, actuating means operatively connecting the motor to the pump diaphragm, a battery for the motor secured to the plate in the other casing, and a circuit connecting the battery and the motor.

2. In a device of the kind described, a supporting plate, casings secured to both sides of the plate, means for conveying water from a supply, and means for delivering the water through a nozzle, said supply and delivering means being arranged on the supporting plate, a pump chamber arranged on the plate in one of the casings, said chamber provided with a pump diaphragm and communicating with inlet and outlet lines, said lines connected to said supply and to said nozzle, respectively, an air chamber connected to the delivering means, a motor arranged on the plate and in the same casing with the pump chamber, actuating means operatively connecting the motor to the pump diaphragm, a battery for the motor secured to the plate in the other casing, and a circuit connecting the battery and the motor.

3. In a device of the kind described, a supporting plate, casings secured to both sides of the plate, means for conveying water from a supply, and means for delivering the water through a nozzle, said supply and delivering means being arranged on the supporting plate, a pump chamber arranged on the plate in one of the casings, said chamber provided with a pump diaphragm and communicating with inlet and outlet lines, said lines connected to said supply and to said nozzle, respectively, a motor arranged on the plate and in the same casing with the pump chamber, actuating means operatively connecting the motor to the pump diaphragm, a battery for the motor secured to the plate in the other casing, a circuit connecting the battery and the motor, and a suction funnel connected to the conveying means and extending through the other casing.

4. In a device of the kind described, a supporting plate, casings secured to both sides of the plate, means for conveying water from a supply, and means for delivering the water through a nozzle, said supply and delivering means being arranged on the supporting plate, a pump chamber arranged on the plate in one of the casings, said chamber provided with a pump diaphragm and communicating with inlet and outlet lines, said lines connected to said supply and to said nozzle, respectively, a motor arranged on the plate and in the same casing with the pump chamber, a fixed shaft, a crank pin arranged to rotate about the shaft, means for rotating the crank pin from the motor, a cup-shaped driving member secured on the crank pin and engaging over the fixed shaft, a connecting rod connected to the member and to the pump diaphragm to swing about pivots at right angles to each other, a battery for the motor secured to the plate in the other casing, and a circuit connecting the battery and the motor.

5. In a device of the kind described, a supporting plate, casing secured to both sides of the plate, means for conveying water from a supply, and means for delivering the water through a nozzle, said supply and delivering means being arranged on the supporting plate, a pump chamber arranged on the plate in one of the casings, said chamber provided with a pump diaphragm and communicating with inlet and outlet lines, said lines connected to said supply and to said nozzle, respectively, a motor arranged on the plate and in the same casing with the pump chamber, actuating means operatively connecting the motor to the pump diaphragm, a battery for the motor secured to the plate in the other casing, a circuit connecting the battery and the motor, and a gravity-controlled switch for making and breaking the circuit.

KLAUS GETTWART.
HELMUTH SCHMIDT.